United States Patent

Foulkes et al.

[15] 3,647,993

[45] Mar. 7, 1972

[54] TONE DISABLER

[72] Inventors: John D. Foulkes, Lexington; Warren G. Bender, Wellesley, both of Mass.

[73] Assignee: Wescom, Inc., Downers Grove, Ill.

[22] Filed: May 18, 1970

[21] Appl. No.: 38,446

[52] U.S. Cl. ........................................179/170.2, 179/2 DP

[51] Int. Cl. ..........................................................H04b 3/20

[58] Field of Search................179/170.2, 170.6, 170.4, 2 DP

[56] References Cited

UNITED STATES PATENTS 3,069,501 12/1962 Gilman et al. ......................179/170.2

*Primary Examiner*—Kathleen H. Claffy
*Assistant Examiner*—William A. Helvestine
*Attorney*—Wolfe, Hubbard, Leydig, Voit & Osann

[57] ABSTRACT

For use in a long-distance telephone link alternately employed for voice communications and data transmission, a tone disabler for inhibiting an associated echo suppressor in response to a tone signal, such as is transmitted under existing practices prior to the transmission of data to insure that all echo suppressor controlled attenuation is removed from the telephone link during data transmission. Series and parallel resonant filters tuned to the tone frequency and a comparator circuit are used to compare the level of the tone frequency energy in the tone disabler's input signals against the level of all other voice frequency or so-called guard band energy, so that a tone signal confirming timing sequence is initiated only when the tone signal energy predominates. Once a tone signal is confirmed, the inputs to the comparator circuit are switched from the filters to a broad band load impedance, so that the tone disabler is transferred from a tone detecting to a holding mode in which the comparator circuit and a simple RC delay circuit maintain the associated echo suppressor in an inhibited condition throughout the data transmission and for a predetermined time after the tone disabler's input signal level drops below a predetermined threshold characteristic of the completion of the data transmission. Solid state switching devices are used for inhibiting and releasing the associated echo suppressor and for transferring the tone disabler between its tone detecting and holding modes to eliminate switching transients and other potential sources of noise such as might interfere with or degrade the performance of the tone disabler, associated echo suppressor, or other equipment located nearby.

12 Claims, 4 Drawing Figures

INVENTORS.
JOHN D. FOULKES
WARREN G. BENDER
BY
Wolfe, Hubbard, Leydig, Voit & Osann
ATTORNEYS.

INVENTORS.
JOHN D. FOULKES
WARREN G. BENDER
BY
Wolfe, Hubbard, Leydig, Voit & Osann
ATTORNEYS.

INVENTORS.
JOHN D. FOULKES
WARREN G. BENDER
BY
Wolfe, Hubbard, Leydig, Voit & Osann
ATTORNEYS.

INVENTORS.
JOHN D. FOULKES
WARREN G. BENDER
BY
Wolfe, Hubbard, Leydig, Voit & Osann
ATTORNEYS.

TONE DISABLER

BACKGROUND OF THE INVENTION

This invention relates to telephony, and more particularly to tone disablers for echo suppressors used in long-distance telephone systems.

As is well known, long-distance telephone links generally include one or more echo suppressors to reduce to negligible levels the return echo that is generally present because of imperfect balancing of the hybrid circuits used for converting from the typical long distance four-wire system to the typical local two-wire systems, and vice versa. If no echo suppressor was provided, the long distance system might be essentially useless for voice communications, since the average speaker is extremely disturbed, if not utterly confused, by an echoing of his speech, if the echo is delayed from the original speech by more than about 45 milliseconds. Such return or echo delays, i.e., round trip transit times, in excess of 45 milliseconds are not at all unusual. Indeed, with the advent of communication satellites, modern long distance telephone facilities are being designed to handle return delays of 600 milliseconds and longer.

Of course, in modern telephony, a long-distance system is preferably suitable for data transmission, as well as voice communication. However, in data transmission, normal return echos are of no concern. Instead, the primary emphasis is on the rapid and efficient transmission of data between the interconnected data terminals, without the loss of any informational content. Further, a desirable feature is that the telephone link should be capable of handling data simultaneously transmitted in opposite directions. Thus, as a practical matter, a long distance link is not suitable for data transmission, unless provision is made to hold all of the echo suppressor controlled attenuation or loss out of the system during the data transmission. Therefore, in order that a telephone network be alternately suitable for either voice or data transmission, a tone disabler is generally employed in connection with the echo suppressor to inhibit the echo suppressor during data transmission while allowing the echo suppressor to operate normally for voice transmission.

SUMMARY OF THE INVENTION

It is an object of the present invention to provide a new and improved tone disabler for use in association with a wide variety of echo suppressors, including those with linear logic circuits. A more specific object is to provide a tone disabler of the foregoing type which may be readily set by relatively simple adjustments for optimum performance under the existing operating conditions imposed by the associated echo suppressor.

Another object of this invention is to provide a tone disabler in which solid-state switching devices are used to inhibit and release the associated echo suppressor and to transfer the tone disabler from a tone detecting to a holding mode, so that the switching is affected without the production of switching transients or other sources of noise, such as might interfere with or degrade the performance of the tone disabler, associated echo suppressor, or other equipment located nearby.

Still another object of the present invention is to provide a tone disabler in which a relatively sharp separation of tone frequency energy and guard band energy is made to insure highly reliable operation of the tone disabler during its tone detecting mode of operation.

Still another object of this invention is to provide a relatively simple, compact and lightweight tone disabler, which is highly reliable in detecting and confirming a tone signal, holding the associated echo suppressor in an inhibited state during the subsequent data transmission, and automatically releasing the echo suppressor from its inhibited state after the data transmission has been completed for a predetermined amount of time. A related object is to minimize the quantity and complexity of the circuitry of the tone disabler which contributes to only a part of the tone disabler's functions.

Finally, it is an object of the present invention to provide a tone disabler of the foregoing type which fully satisfies all existing and proposed national and international specifications for tone disablers and which is readily adaptable to use in existing and proposed long distance telephone links.

BRIEF DESCRIPTION OF THE DRAWINGS

Other objects and advantages of the invention will become apparent upon reading the follo!ing detailed description and upon reference to the drawings, in which.

DETAILED DESCRIPTION OF THE ILLUSTRATED EMBODIMENT

While the invention will be described, hereinafter, in detail with reference to an illustrated embodiment, it is to be understood that the intent is not to limit it to that embodiment. On the contrary, the intent is to cover all alternative, modifications and equivalents as may be within the spirit and scope of the invention.

Environment

Figure 1:
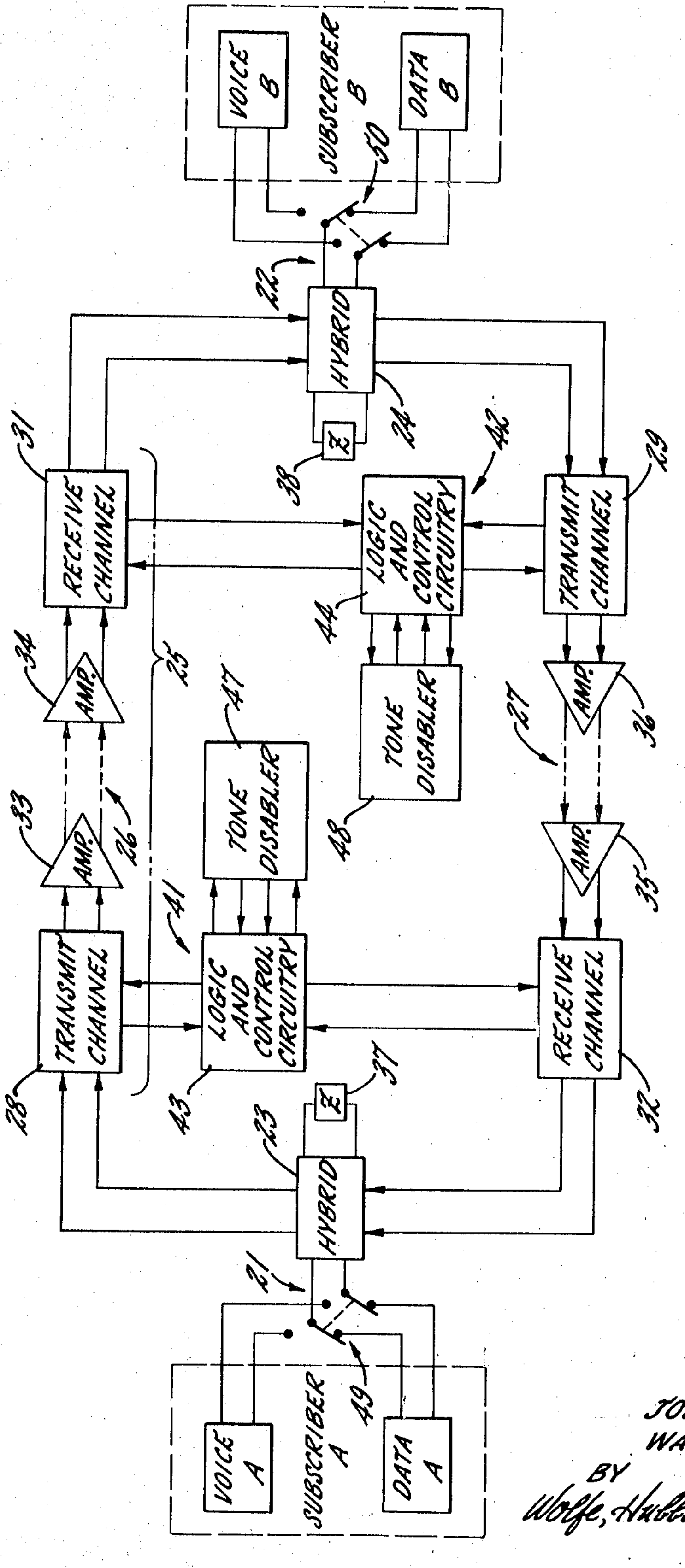
FIG. 1 is a simplified block diagram of a single link long distance telephone circuit incorporating a pair of differential split echo suppressors, each equipped with a respective tone disabler.
Figure 2:
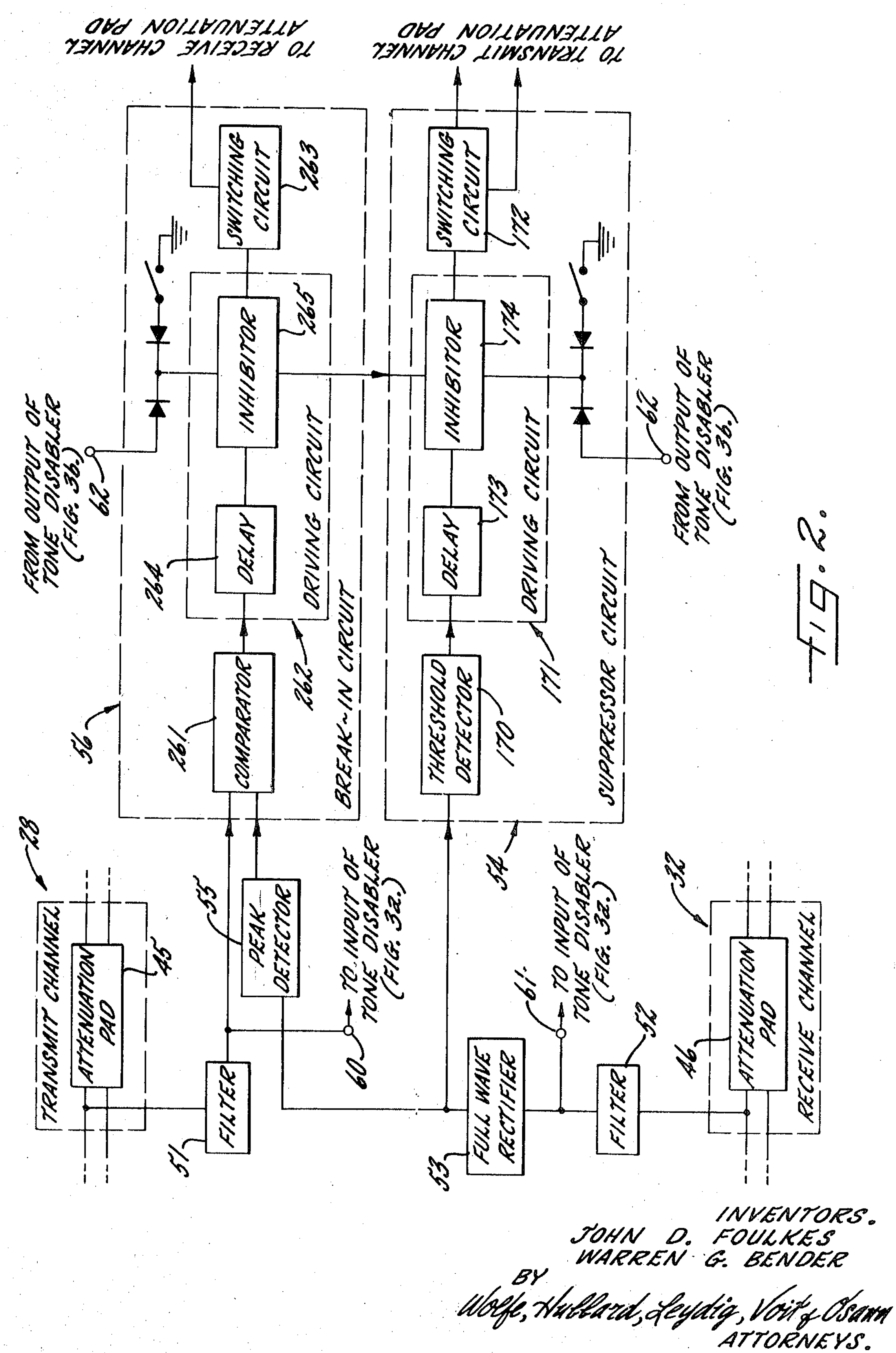
FIG. 2 is a simplified block diagram of one of the differential split echo suppressors of FIG. 1 showing the points of connection to its associated tone disabler.

Turning now to the drawings, and particularly to FIG. 1 there is shown a typical long distance telephone circuit for communication between two subscribers A and B. The terminals 49 and 50 for the subscribers A and B, are alternately useable for voice and data transmission and are connected via respective local two-wire systems 21 and 22 and hybrid circuits 23 and 24 to the opposite ends of a long distance four-wire system 25. The four-wine system 25 includes separate paths 26 and 27, each with respective transmit and receive channels 28, 29 and 31, 32, for transmissions between the terminals 49 and 50. The transmit channel for each subscriber is connected to the receive channel for the other subscriber through a number of repeater amplifiers 33, 34 and 35, 36, which supply the amplification required to compensate for whatever transmission loss there may be.

The long distance circuit shown will be recognized as being a basic single link system. However, it will be appreciated that the present invention may equally as well be employed in much more sophisticated systems, such as those including multiple links and communications satellites (not shown).

The hybrid circuits 23 and 24, which are typically hybrid transformers, are provided to couple signals from the four-wire system 25 to the respective two-wire systems 21 and 22, and vice versa. Ideally, they are perfectly balanced by respective terminating impedances 37 and 38, so that the two paths 26 and 27 of the four-wire system form conjugate arms, such that signals in one path have no effect upon and are not seen by the other path. However, due to the impedance differences that exist between the local two-wire systems that may at any given time be coupled to the hybrid circuits and the impedance irregularities that occur at the hybrid junctions, it is virtually impossible to select a terminating impedance to provide the required perfect impedance balance or match. Accordingly, the values of the terminating impedances 37 and 38 are selected to provide a compromise between the different impedance values required for perfect termination of the respective hybrid circuits 23 and 24, so that the portion of the signal transmitted from one end which is passed through the hybrid circuit at the other end for re-transmission as an echo signal is minimized.

During voice communications, echo suppression is employed to reduce such echo signals to a tolerable level. The echo suppressor per se forms no part of the present invention. Hence, if the details of a typical echo suppressor with which the tone disabler of the present invention may be advantageously employed are of interest, reference may be had to the trade literature of the echo suppressor manufacturers. For illustrative purposes specific reference is had herein to the linear logic echo suppressor described and claimed in the copending, commonly assigned Foulkes and Bender U.S. patent application Ser. No. 802,067, now U.S. Pat. No. 3,560,669. The discussion of the echo suppressor herein will, therefore, be confined to that which is necessary or helpful for a complete understanding of the tone disabler.

More particularly, as here shown, the echo suppression is affected by a pair of differential split echo suppressors 41 and 42, each of which is located at a respective end of the fo$r-wire portion 25 of the circuit to prevent return of potentially disturbing echo signals toward the other or far end of the circuit. To accomplish this, while at the same time permitting voice transmission by either of the subscribers in the presence or absence of transmission by the other subscriber, the echo suppressors 41 and 42 include respective logic and control circuits 43 and 44, each of which determines the signal conditions in the send and receive channels for the respective near end subscriber to controllably insert and remove attenuation or loss into and out of such channels in dependence upon the existing signal conditions.

As previously mentioned, when data is to be transmitted over the network, return echo is generally of little concern. But, the presence of echo suppressor controlled attenuation in either the transmit or receive channels for either of the subscribers can cause bits of data to become undistinguishable or lost. Therefore, for efficient data transmission, it is necessary to inhibit any echo suppressors in the network, so that the attenuation controlled thereby is held out of the transmit and receive channels, regardless of the relative signal levels in these respective channels, until the data transmission has been completed and the network is once again available for voice communications.

To this end, each of the echo suppressors 41 and 42 is equipped with a respective tone disabler 47 and 48. As here shown, the tone disablers 47 and 48 are coupled to the logic and control circuitry of respective ones of the two identical differential split echo suppressors 41 and 42. The tone disablers inhibit their respective echo suppressors in response to a tone signal; i.e., a signal with a predetermined fixed frequency existing for an uninterrupted preset period of time at some energy level above a predetermined threshold. Once the echo suppressors are inhibited, they are held in inhibited states by their respective tone disablers until the data transmission is completed and for a brief period thereafter, called "release hangover time."

Before reaching the details of the tone disabler of the present invention, a brief review of an exemplary one of the echo suppressors 41 and 42 may be helpful. Insofar as possible, to provide a basis for the reader to obtain a more detailed discussion of the echo suppressor if desired, the reference numerals used in the aforementioned Foulkes and Bender U.S. patent to identify particular components of the echo suppressor have been used herein to identify the same components.

Taking the echo suppressor 41 as the exemplary one, it will be seen that it has a linear logic and control circuitry, which automatically sets the echo suppressor 41 in dependence on the signal conditions existing in the transmit and receive channels 28 and 32 for the near end subscriber A for operation in (1) its quiescent mode in which both of the echo suppressor controlled attenuation pads 45 and 46 are removed from the telephone link, (2) its suppression mode in which the attenuation pad 45 is inserted in the transmit channel 28 to provide an attenuation of about 60 db., or (3) its break-in mode in which the attenuation pad 46 is inserted in the receive channel 32 to provide an attenuation of about 6 db.

More particularly, input signals for the echo suppressor's logic and control circuitry are taken from the transmit and receive channels 28 and 32 via respective band pass filters 51 and 52 which have pass bands of about 300–3,000 Hz., so that the high- and low-frequency noise components generally found in long distance telephony are sharply attenuated while still providing an input frequency range within which a substantial portion of the speech signals fall during normal telephone conversation.

The filtered input signal from the receive channel 32 is, in turn, applied to a full-wave rectifier 53 where it is converted to a DC signal that has a level which closely corresponds to and follows the signal level actually existing in the receive channel. This DC signal is applied to both a suppressor circuit 54 and a peak detector 55.

The suppressor circuit 54 includes a threshold detecting circuit 170 for determining whether the DC signal provided by the full-wave rectifier 53 is above or below a predetermined suppression threshold level. So long as the DC signal remains below the threshold level, the suppressor circuit 54 is disabled and the echo suppressor 41 operates in its quiescent mode with the suppression loss 45 removed from the transmit channel 28. However, within a very short time, referred to as the "-suppression operate time," after the DC signal rises above the threshold level, the threshold detector 170 triggers a driving circuit 171 which then, in turn, activates a switching circuit 172 to insert the suppression loss 45 into the transmit channel 28 for operation of the echo suppressor in its suppression mode. The short suppression operate time, i.e., 1 millisecond or so, assures that the suppression loss is inserted into the transmit channel 28 before potentially disturbing echo signals have the opportunity to travel from the output of the receive channel 32, through the hybrid 23 and into the send channel 28, regardless of whatever end delay may be present.

Thereafter, when the level of the DC signal provided by the full-wave rectifier 53 falls below the suppression threshold level, a delay means 173 delays the deactivation of the switching circuit 172, thereby causing the suppressor circuit 54 to pause for a predetermined time, referred to as the "suppression hangover time," before removing the suppression loss 45 from the transmit channel 28 and returning the echo suppressor to operation in its quiescent mode. Should the DC signal level rise above the threshold level during the suppression hangover time, the suppressor circuit 54 quickly recycles to prevent the removal of the suppression loss 45. Therefore, so long as the near end subscriber A is quiet, the echo suppressor 41 inserts and removes the suppression loss 45 into and out of the transmit channel 28 such that the echo suppressor is switched between its quiescent and break-in modes in dependence upon the receive channel signal level.

However, when the near end subscriber A breaks in on or interrupts a transmission from the far end subscriber B, a break-in circuit 56 applies an inhibiting signal to a suppressor circuit inhibitor stage 174 to deactivate the switching circuit 172, thereby removing the large suppression loss 45 from the near end subscriber's transmit channel 28. At the same time, a break-in switching circuit 263 is actuated to insert the much smaller break-in loss 46 into the receive channel 32 for operation of the echo suppressor in its break-in mode. Thus, to determine whether the near end subscriber is attempting to break-in or not, the break-in circuit 56 includes a comparator 261 for linearly comparing the level of the filtered input signal received from the transmit channel 28 with the level of a floating DC reference signal provided by the peak detector 55 and representative of the average peak signal level in the receive channel 32. When the transmit channel signal level rises above the level of the floating DC reference signal, the comparator circuit 261 actuates a driving circuit 262 which, in turn, provides the inhibiting signal for the suppressor circuit 174 and the actuating signal for the switching circuit 263 necessary to transfer the echo suppressor to its break-in mode.

The break-in circuit 456 also includes an inhibitor 265. Thus, the echo suppressor can be completely inhibited by applying inhibiting signals, in the illustrated case ground potential, to the suppressor circuit and break-in circuit inhibitor stages 174 and 265, respectively. As will become clearer from what follows, the tone disabler of the present invention applies such inhibiting signals to the terminals 62 to hold the echo suppressor in an inhibited state or condition with both of the attenuation pads 45 and 46 removed from the long distance link for data transmission. In effect, the tone disabler seizes control of the echo suppressor by applying an inhibiting signal, so that the echo suppressor remains in an inhibited state throughout any data transmission and for the subsequent release time, despite whatever signal levels may exist in the transmit and receive channels 28 and 32.

Tone Disabler

1. General

Figure 3A:
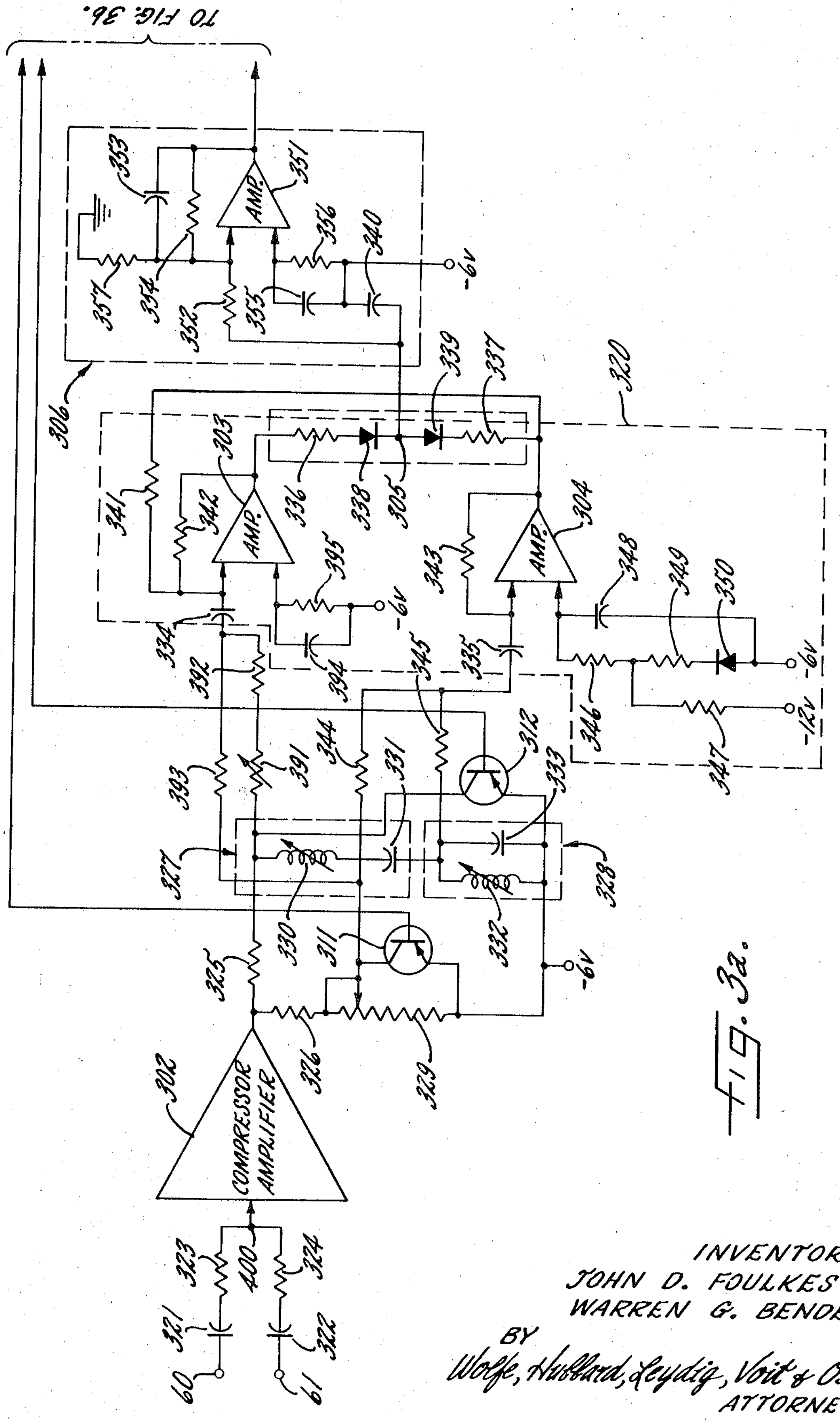
FIGS. 3*a* and 3*b*, when joined as indicated, form a simplified electrical schematic of an exemplary tone disabler constructed in accordance with the present invention.
Figure 3B:
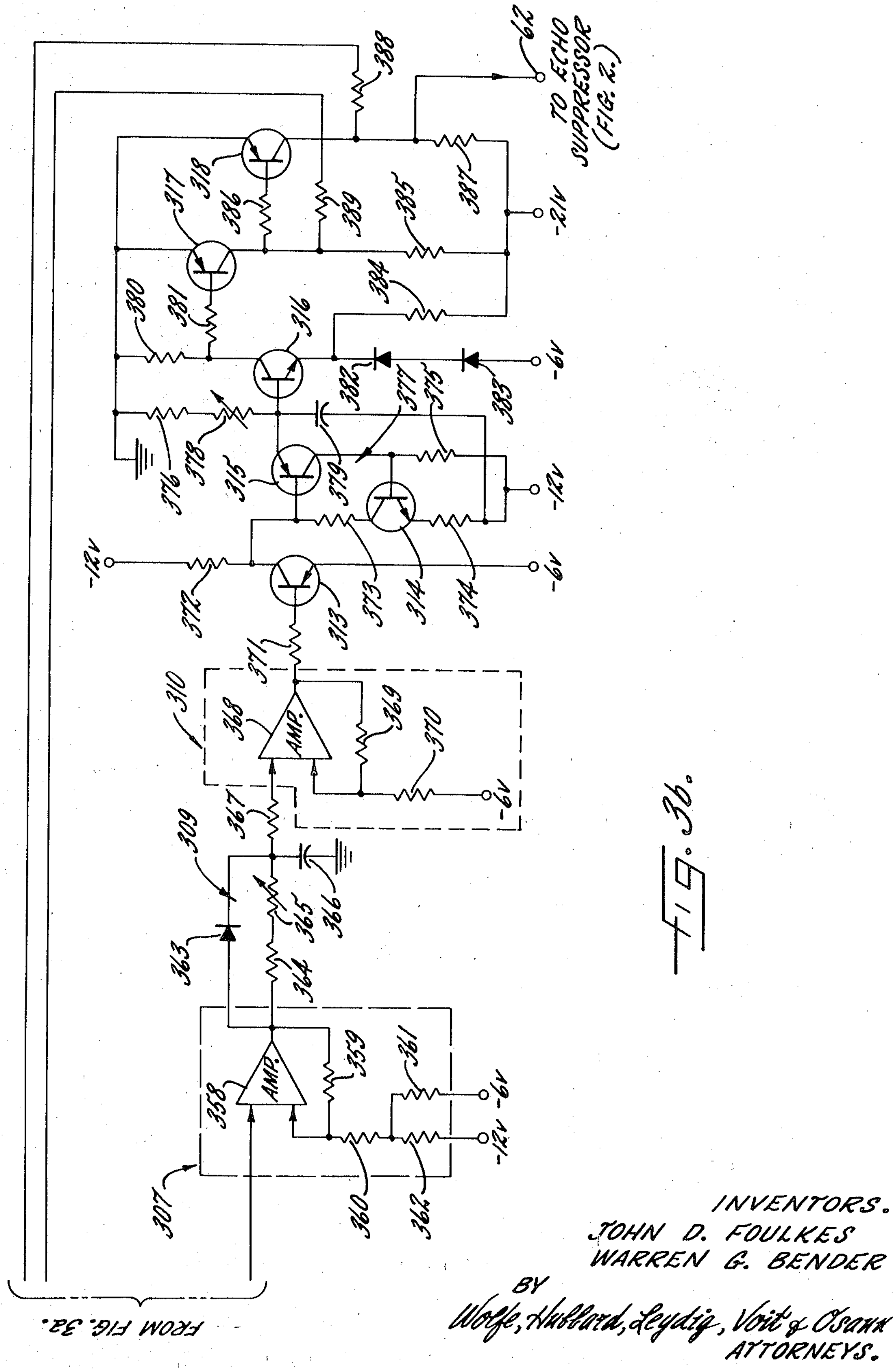

Turning now to FIGS. 3*a* and 3*b* for a detailed discussion of the present invention, it will be seen that the illustrated tone disabler has a pair of balanced, high-impedance terminals 60 and 61, which are respectively coupled via substantially linear circuitry to the transmit and receive channels 28 and 32. Suitably, such coupling is affected through the band-pass filters 51 and 52 of the echo suppressor, since any signals outside the 300–3,000 Hz. passbands of the filters may be neglected as primarily comprising undesired noise. The impedance presented by the inputs 60 and 61 is selected to be sufficiently high to prevent the tone disabler from having any appreciable loading effect on the telephone link or associated echo suppressor.

As previously mentioned, in keeping with existing practices, the transmission of data over a telephone link is preceded by the transmission of a warning or "tone signal," say a signal of 2,100 Hz. which has a duration in excess of about 300 millisecond. Thus, during operation of the telephone link in its quiescent mode or during use thereof for voice communications, the tone disabler here disclosed continuously monitors the transmit and receive channels 28 and 32 for such a tone signal. At the same time the associated echo suppressor operates in its quiescent, suppression, or break-in modes in dependence on the signal levels existing in the transmit and receive channels 28 and 32 as previously described.

When an apparent tone signal is first detected, a timing sequence is initiated within the tone disabler to confirm that the detected signal is, in fact, a tone signal. The tone disabler inhibits or disables the associated echo suppressor only if the tone frequency signal persists without any substantial interruption for a predetermined period or "operate time" characteristic of a tone signal, say for a period of about 280 milliseconds. Should the tone frequency signal suffer a substantial interruption before the operate time has elapsed, say for a period in excess of 60 milliseconds, the signal is not confirmed, the timing sequence is terminated, and the associated echo suppressor is not inhibited.

However, when a tone signal is confirmed, the associated echo suppressor is inhibited, and the tone disabler holds it in its inhibited state throughout following data transmission and for the predetermined release time, generally on the order of about 200 milliseconds, following the completion of the data transmission. When the release time expires without further data being transmitted, the tone disabler releases the associated echo suppressor, which then reverts to operation in its various modes depending on the signal level existing in the transmit and receive channels 28 and 32.

From the foregoing, it will be appreciated that the tone disabler has three primary functions or operating modes; (1) tone detecting, (2) holding, and (3) releasing. For the convenience of the reader, these three modes will be separately discussed in the followi..g description of the tone disabler shown.

2. Tone Detection

To monitor the transmit and receive channels 28 and 32 for the presence of a tone signal, the linear input signals received at the input terminals 60 and 61 are conducted via respective coupling capacitors 321 and 322 and summing resistors 323 and 324 to a summing node 400. The resultant sum signal is amplified in a compressor-type amplifier 302, so that it is presented at the output of the compressor amplifier 302 as a signal of substantially constant level well above whatever random noise may be present from other sources. The amplified sum signal may, of course, contain either or both tone frequency energy and nontone energy. The tone frequency energy must promote inhibiting of the associated echo suppressor, while the nontone or "guard band" energy must oppose inhibiting. Thus, the initial determination as to whether a tone signal is present or not is made by comparing the tone energy against the guard band energy, such that the confirming timing sequence is begun only !hen the tone energy exceeds the guard band energy. To this end, the amplified sum signal from the compressor amplifier 302 is coupled through a resistor 325 to a pair of filters 327 and 328 by which it is separated into its tone and guard band components. The tone and guard band components are, in turn, fed to a comparator circuit indicated generally at 320.

It should be noted that as a part of the holding circuitry for the tone disabler here shown the output of the compressor amplifier 302 is returned to a point of reference potential through a load resistor 326, which is connected in series with the parallel combination of a rheostat 329 and the collector-emitter circuit of a transistor 311. Further, the filters 327 and 328 are connected in parallel with the collector-emitter circuit of a transistor 312. The purpose of these parts of the tone disabler will be discussed in detail in the following description of the holding function. For now it suffices to note that while the tone disabler is monitoring for a tone signal, the transistors 311 and 312 are respectively held in conductive and nonconductive states, so that the rheostat 329 is bypassed and the filters 327 and 328 are permitted to perform their frequency separation function.

In keeping with one of the more detailed aspects of the present invention, to separate the tone and guard band energy, the filters 327 and 328 respectively comprise series and parallel resonant circuits which are adjusted to resonance at the tone frequency. As shown, the filters 327 and 328 are connected in series across the output of the compressor amplifier 302. Thus, it will be seen that the band-pass characteristic of a series resonant circuit is used by the filter 327 to provide the guard band energy and reject the tone energy while, on the other hand, the band elimination characteristic of a parallel resonant circuit is used by the filter 328 to provide the tone energy and reject the guard band energy. Moreover, it will be appreciated that by connecting the filters 327 and 328 in series, the characteristics of their respective resonant circuits are accentuated. This has the advantage of permitting the use of relatively simple filter circuits while still providing sharp frequency separation. For example, as here shown, the filter 327 is formed by an inductor 330 and a series capacitor 331, whereas the filter 328 is formed by an inductor 332 and parallel capacitor 333. The inductors 330 and 332 are indicated as being variable for adjustment of the resonant frequencies of the filters.

In keeping with another feature of this invention, the comparator 320 tends to oppositely charge a capacitor 340 in dependence on whether the tone frequency energy exceeds the guard band energy or not. To this end, it comprises a pair of operational amplifiers 303 and 304 which have their outputs coupled through respective resistors 336 and 337 and oppositely poled diodes 338 and 339 to a junction 305 which, in turn, is returned to a point of reference potential through the capacitor 340. The combined tone and guard band energy is fed from the filters 327 and 328 via a pair of input resistors 391 and 392 and a coupling capacitor 334 to the inverting input of the operational amplifier 303. The tone energy is also fed from the filter 328 via an input resistor 345 and coupling capacitor 335 to the inverting input of the operational amplifier 304. The operational amplifiers 303 and 304 have respective feedback resistors 342 and 343 connected between their output and inverting input terminals in the usual manner, and the value of the feedback resistors 342 and 343 are selected to provide identical gains for the amplifiers 303 and 304 to input signals applied through their respective input resistors 391, 392 and 345.

To limit the response of the operational amplifier 303 to only the guard band energy, even though its inverting input is coupled across the series combination of the filters 327 and 328, a resistor 341 is connected between the output of the operational amplifier 304 and the inverting input of the operational amplifier 303. The value of the resistor 341 is selected so that the operational amplifier 303 has a gain of minus one to the tone frequency energy applied therethrough. Thus, the operational amplifier 303 rejects or cancels out the tone frequency energy applied thereto, while responding to any guard band energy.

The noninverting inputs of the operational amplifiers 303 and 304 are biased so that under quiescent conditions the outputs thereof are positively and negatively biased, respectively, by identical potentials relative to the potential to which the capacitor 340 is referenced. The values of the resistors 336 and 337 are the same and the diodes 338 and 339 are matched so that under quiescent conditions the junction 305 is held at the same potential as that to which the capacitor 340 is referenced, as here shown –6 volts. Thus, it will be seen that under quiescent conditions, there is a balanced condition and no charge is accumulated on the capacitor 340. To establish the balanced quiescent conditions, the noninverting input of the operational amplifier 303 is connected to a bias supply through a drift-stabilizing resistor 395 and parallel connected AC bypass capacitor 394. On the other hand, since none of the available bias supplies of the illustrated embodiment are of appropriate voltage for biasing the operational amplifier 304, the noninverting input thereof is connected by a drift stabilizing resistor 346 to the midpoint of a voltage divider, which is formed by a pair of resistors 347 and 349 and a diode 350 connected across two of the available supplies. Of course, in keeping with accepted practices the bias circuit for the operational amplifier 304 includes the usual parallel connected AC bypass capacitor 348.

As will be appreciated from the foregoing, when the level of the tone frequency energy exceeds the level of the guard band energy, the balance of the comparator circuit 320 is upset in a negative sense, thereby causing the capacitor 340 to charge negatively relative to the potential to which it is referenced. In contrast, when the guard band energy predominates, the balance is upset in a positive sense to charge the capacitor 340 positively relative to its reference potential.

For efficient and sensitive operation of the comparator circuit 320, the capacitor 340 should present a relatively low AC impedance to current flow to and from the junction 305. The potential across the capacitor 340 is, therefore, subject to high frequency excursions in response to high frequency changes in the tone frequency and guard band energy levels. Consequently, to smooth the potential appearing across the capacitor 340 an integrator circuit 306 is employed to supply an output signal which is relatively free of undesirable high frequency excursions but which has a level indicative of whether a tone signal is present or not. To this end, as here shown, the integrator circuit 306 comprises an operational amplifier 351 which is in integrating configuration with an integrating capacitor 353 and a parallel discharge resistor 354 connected between its output and inverting input terminals. The noninverting input of the operational amplifier 351 is connected via a drift stabilizing resistor 356 and a parallel connected AC bypass capacitor 355 to the reference potential for the capacitor 340. Its inverting input, on the other hand, is coupled to the midpoint of a voltage divider formed by an input resistor 352 which is connected to the junction 305 and a dropping resistor 357 which is returned to ground. Thus, it will be seen that when the tone frequency energy predominates, the output signal from the integrator 306 is positive relative to the output signal provided thereby when the guard band energy predominates.

It is noteworthy that by virtue of the voltage divider 352, 357 the operational amplifier 351 is biased so that under quiescent conditions its output signal is relatively negative as is characteristic of a predominance of guard band energy. This insures that the timing sequence for confirming a tone signal is not initiated until a tone signal has been positively detected. It should be understood, however, that the dropping resistor 357 is large relative to the input resistor 352, so that the confirming timing sequence is begun in response to even a slight negative charge on the capacitor 340.

It is also noteworthy that the value of the resistor 354 is selected to establish a compromise discharge time constant for the capacitor 353. The compromise is between the conflicting considerations that (1) too long a discharge time constant causes a sluggish operation and makes the operate time of the tone disabler overly dependent on and highly sensitive to normal variations in the input signal levels, and (2) too short a time constant defeats the intended smoothing of the potential appearing across the capacitor 340. Typically, a suitable compromise discharge time constant is about 30 milliseconds.

To further insure that the operate time of the tone disabler is relatively independent of any normal variations in the input signal levels, the output signal level of the integrator circuit 306 is monitored by a threshold detector 307. The threshold detector 307 is switched from one state to the other as the level of the signal from the integrator circuit 306 rises above and drops below a predetermined threshold for detection of a tone signal. Thus, the output signal provided by the threshold detector 307 is substantially constant at a first level when the tone disabler is in its quiescent state or when the guard band energy predominates and at a second level when the tone frequency energy predominates. Typically, the threshold detector 307 may be a Schmitt trigger or the like, including an amplifier 358 with its inverting input coupled to receive the output signal from the integrator circuit 306 and a feedback resistor 359 coupled between its output and noninverting input terminals to provide regenerative feedback. The threshold level at which the Schmitt trigger 307 is switched or triggered is established by the bias applied to the noninverting input of the amplifier 358. In the illustrated embodiment, such bias is shown as being applied via a drift-stabilizing resistor 360 connected to the midpoint of a pair of voltage-dividing resistors 361 and 362 which, in turn, are connected across two of the available bias supplies.

As will be appreciated, in the particular embodiment here shown, the output signal level from the Schmitt trigger 307 becomes increasingly negative when the tone signal energy predominates. Specifically, when the circuit values hereinafter stated are employed, the output signal level from the threshold detector drops from about −3.2 volts to about −10 volts when it is triggered in response to a predominance of tone frequency energy.

The operate time for the tone disabler is set by an RC delay circuit 309, which is connected to the output of the Schmitt trigger 307. When the output signal from the Schmitt trigger drops to the level characteristic of a predominance of tone frequency energy, a capacitor 366, which is referenced to a point ground potential, begins to charge at a rate determined by the values of the series charging resistors 364 and 365. If the tone frequency energy predominates for the predetermined operate time, the tone signal is confirmed and the voltage across the capacitor 366 builds to a level sufficient to trigger a second Schmitt trigger 310. However, to insure that the tone disabler is recycled should the tone signal be interrupted for a substantial period, connected in parallel with the resistors 364 and 365 there is a diode 363 which is poled to provide a relatively rapid discharge path for the capacitor 366. The operate time for the tone disabler and the maximum tone signal interruption that can be tolerated without recycling can be readily adjusted for optimum performance by varying the RC charge and discharge time constants, respectively, associated with the capacitor 366. As before mentioned, typically the charge time constant is set to establish an operate time of about 280 milliseconds and the discharge time constant is set to insure that the capacitor 366 will discharge to its quiescent voltage if the tone signal is interrupted for longer than about 60 milliseconds.

As here shown, the Schmitt trigger 310 includes an amplifier 368 which has a resistor 369 connected between its output terminal and noninventing input terminals to provide a regenerative feedback path, and its inverting input terminal connected across the capacitor 366 by an input resistor 367. The threshold level to which the capacitor 366 must charge to trigger the Schmitt trigger 310 is set by the bias applied via a drift stabilizing resistor 370 to the noninventing input of the amplifier 368.

In keeping with another feature of the present invention, the tone disabler here shown, includes solid-state switching elements for applying the inhibiting signal to the associated echo suppressor, so that the echo suppressor is inhibited and released without the generation of switching transients and the like which might interfere with or degrade the performance of the tone disabler, echo suppressor, or other equipment located nearby.

To carry out this feature of the invention, the output signal levels of the Schmitt trigger 310 are translated to levels appropriate for driving the transistorized switching circuitry by a transistor 313, which forms the input stage of a driving circuit 377. As here shown, the transistor 313 has its base connected through a current limiting resistor 371 to the output of the Schmitt trigger 310, its collector connected through a load resistor 372 to a −12-volt bias supply and its emitter returned to a −6-volt bias supply. It will, therefore, be understood that the transistor 313 is switched from a conductive state to a nonconductive state when the Schmitt trigger 310 is triggered; i.e., when the capacitor 366 charges to a level confirming the presence of a tone signal. As will be appreciated, the voltages of the collector and emitter bias supplies and the value of the collector load resistor for the transistor 313 determine the voltage translation obtained.

In the illustrated embodiment, the release time for the tone disabler is set in the driving circuit 377. Thus, provision is made therein to insure that the operate and release times are substantially independent of one another. More particularly, as shown, there is a transistor 315 which has its base connected to the collector of the transistor 313, its collector connected through a load resistor 375 to a bias supply, and its emitter returned through a pair of load resistors 376 and 378 to a point of ground potential. Further, as the output stage of the driver circuit 377, there is a transistor 316 which has its base connected to the emitter of the transistor 315, its collector returned through a load resistor 380 to the point of ground potential and its emitter clamped at a voltage determined by a biasing resistor 384, the clamping diodes 382 and 383, and the indicated bias supplies. Thus, when the transistor 313 is switched to a nonconductive state, the transistor 315 is switched to a conductive state to, in turn, tend to switch the transistor 316 to a nonconductive state.

However, to set the release time for the tone disabler, connected across the base-emitter circuit of the transistor 315 there is a capacitor 379. Ideally, the capacitor 379 is instantaneously charged when the transistor 315 is switched to its conductive state so that a very fast rise time pulse is applied to the base of the transistor 316 to switch it to its nonconductive state. The capacitor 379 should then be slowly discharged at a much slower rate after the transistor 315 reverts to its nonconductive state to maintain the transistor 316 in a nonconductive state for the desired release time. Accordingly, to approach such ideal conditions, a transistor 314 has its base connected to the collector of the transistor 315, its collector connected through a resistor 373 to the base of the transistor 315, and its emitter connected through a small bias resistor 374 to the source of charging potential for the capacitor 382. Thus, it will be seen that when the transistor 315 is switched to its conductive state, the transistor 314 is, in turn, switched to its conductive state, so that a low impedance charging circuit comprising the collector-emitter circuit of the transistor 315, the base-emitter diode of the transistor 314, and the bias resistor 374 is provided for the capacitor 382. Of course, the release time for the tone disabler may be adjusted by selecting the resistors 376 and 378 to provide the desired discharge time constant for the capacitor 379.

The switching devices that are employed to inhibit the associated echo suppressor and to transfer the tone disabler to its holding mode comprise a pair of cascade connected transistors 317 and 318, which are driven by the transistor 316. More specifically, the transistor 317 is a normally conductive transistor which has its base connected via a current-limiting resistor 381 to the collector of the transistor 316, its emitter returned to the point of ground potential, and its collector connected through a load resistor 385 to a source of bias potential. The transistor 318, on the other hand, is a normally nonconductive transistor which has its base connected through a current-limiting resistor 386 to the collector of the transistor 317, its emitter returned to ground potential, and its collector connected by a load resistor 387 to the bias supply. As will be understood, when the transistor 316 is switched to its nonconductive state, the transistor 317 is switched to a nonconductive state to, in turn, switch the transistor 318 to a conductive state. Of course, when the transistor 318 is in a conductive state, the tone disabler output terminal 62 is substantially at ground potential and the associated echo suppressor is, therefore, inhibited.

3. Holding Mode

To maintain the associated echo suppressor in an inhibited state after a tone signal is confirmed and during the subsequent data transmission, the tone disabler is transferred from a tone detection mode to a holding mode. To this end, referring to both FIGS. 3*a* and 3*b*, the collectors of the transistors 317 and 318 are coupled by respective current limiting resistors 388 and 389 to the bases of the transistors 312 and 311, respectively. Hence, when the transistor 317 is switched from its conductive state to its nonconductive state, the transistor 312 is switched from its nonconductive state to a conductive state, so that its collector-emitter circuit provides a low-impedance shunt path across the frequency separation filters 327 and 328. On the other hand, when the transistor 318 is switched from its nonconductive state to its conductive state, the transistor 311 is switched from a conductive state to a nonconductive state, so that the low-impedance shunt path across the rheostat 329 is removed.

As will be seen, when the transistors 311 and 312 are respectively switched to nonconductive and conductive states, the inputs to the operational amplifiers 303 and 304 are altered from a frequency selective characteristic to a broad band characteristic. Specifically, when the tone disabler is in its holding mode, input signals are applied to the inverting input terminals of the operational amplifiers 303 and 304 from the slider of the rheostat 329 via respective input resistors 393 and 344 and the coupling capacitors 334 and 335. The gains of the operational amplifiers 303 and 304 to these input signals are identical. Thus, by virtue of the cross coupling resistor 341, the inputs to the operational amplifier 303 cancel one another, so that the comparator circuit 320 tends to maintain the capacitor 340 charged negatively relative to its reference potential. Of course, so long as the input signal energy is sufficient to maintain the average or integrated charge on the capacitor 340 above the threshold level for triggering the Schmitt trigger 307, the tone disabler holds the associated echo suppressor in an inhibited state. The minimum energy level sufficient for that purpose is set by adjusting the rheostat 329, so that the energy level characteristic of normal data transmission is sufficient, but the energy level of noise is not.

4. Release Mode

When the data transmission is completed, the capacitor 340 rapidly reverts to its quiescent condition, such that it assumes a charge that is slightly positive relative to the potential to which the capacitor is referenced. The integrating capacitor 353 discharges through the resistor 354, so that the level of the output signal from the integrating circuit 306 drops below the threshold level of the threshold detector 307. The capacitor 366, therefore, discharges through the diode 363 and Schmitt trigger 310 reverts to its quiescent condition. Thus, the transistor 313 is switched into conduction, to, in turn, switch the transistors 314 and 315 out of conduction. At this point, the capacitor 379 starts to discharge at a rate established by the values of the resistors 376 and 378.

If there is no data transmission during the predetermined release time, the capacitor 379 discharges to the point that the transistor 316 is switched into conduction to, in turn, switch the transistors 317 and 318 into and out of conduction, respectively. In that event, the associated echo suppressor is released from its inhibited state and the tone disabler reverts to its tone detection mode. However, if data transmission does occur during the release time, for example if there is a brief pause or interruption in the data transmission, the discharging of the capacitor 379 does not reach the point that the transistor 316 is switched into conduction and, therefore, the associated echo suppressor is not released from its inhibited state. To the contrary, the data transmission is permitted to continue to completion, without any further tone signal to insure that the associated echo suppressor is inhibited.

Conclusion

From the foregoing it will now be understood that the present invention provides a highly reliable and compact tone disabler. It will be seen that advantage has been taken of unique circuit techniques to maintain the circuitry relatively simple while insuring that the tone disabler has a great deal of flexibility, so that it can be readily adjusted for optimum performance under a wide variety of conditions. It will also be seen that care has been taken to insure that operation of the tone disabler does not interfere with or degrade the performance of other equipment located nearby.

The following table provides exemplary values and types for the components shown in the illustrated embodiment:

TABLE 1

| Resistors No. | Ohms |
|---|---|
| 323 | 27K |
| 324 | 27K |
| 325 | 8.2K |
| 326 | 8.2K |
| 329 | 3.0K–10K |
| 336 | 5.11K±1% |
| 337 | 5.11K±1% |
| 341 | 121K |
| 342 | 121K |
| 343 | 121K |
| 344 | 33K |
| 345 | 39K |
| 346 | 121K |
| 347 | 91K |
| 349 | 5.11K±1% |
| 352 | 16K |
| 354 | 300K |
| 356 | 15K |
| 357 | 510K |
| 359 | 24K |
| 360 | 1K |
| 361 | 3K |
| 362 | 4.3K |
| 364 | 5.1K |
| 365 | 10K |
| 367 | 51K |
| 369 | 12K |
| 370 | 4.3K |
| 371 | 3.9K |
| 372 | 10.0K |
| 373 | 510 |
| 374 | 10Ω |
| 375 | 100K |
| 376 | 51K |
| 378 | 0K–25K |
| 380 | 12K |
| 381 | 18K |
| 384 | 6.8K |
| 385 | 2.4K |
| 386 | 39K |
| 387 | 2.4K |
| 388 | 2.4K |
| 389 | 2.4K |
| 391 | 25K |
| 392 | 0K–51K |
| 393 | 33K |
| 395 | 60.8K |
| **Capacitors No.** | |
| 321 | 0.1 mf. |
| 322 | 0.1 mf. |
| 331 | 5100 pf. |
| 333 | 0.300 mf. |
| 334 | 0.1 mf. |
| 335 | 0.1 mf. |
| 340 | 0.1 mf. |
| 348 | 10.0 mf. |
| 353 | 0.1 mf. |
| 355 | 10.0 mf. |
| 366 | 33.0 mf. |
| 379 | 4.7 mf. |
| 394 | 10.0 mf. |
| **Operational Amplifiers No.** | |
| 303 | MC1435P |
| 304 | MC1435P |
| 351 | MC1435P |
| 358 | MC1435P |
| 368 | MC1435P |
| **Inductors No.** | |
| 330 | 0.9–1.1HY |
| 332 | 19–21 MHY |
| **Transistors No.** | |
| 311 | MPS404A |
| 312 | MPS404A |
| 313 | MPS404A |
| 314 | 2N1711 |
| 315 | MPS404A |
| 316 | 2N1711 |
| 317 | MPS404A |
| 318 | MPS404A |
| **Diodes No.** | |
| 338 | 1N4454 |
| 339 | 1N4454 |
| 350 | 1N4454 |
| 363 | 1N4454 |
| 382 | 1N4454 |
| 383 | 1N4454 |

We claim:

1. In a tone disabler for use with an echo suppressor in a telephone system of the type including separate transmit and receive channels with attenuation inserted and removed therefrom by said echo suppressor in dependence on the signal conditions existing in said channels; the combination comprising summing means coupled to said transmit and receive channels for providing a sum signal representative of the signals in said transmit and receive channels; a first frequency rejection filter connected to said summing means for responding to all energy in said sum signal except for any energy substantially at a predetermined tone frequency to provide a guard band signal level; a second frequency selection filter connected to said summing means for responding to any energy substantially at said tone frequency and rejecting substantially all energy at any other frequency to provide a tone frequency signal level; and means for comparing the levels of said guard band and tone frequency signals including first and second amplifying means each having an inverting input and an output, said first amplifying means having its inverting input coupled across said second filter for providing an output signal representative of the level of said tone frequency signal, and said second amplifying means having its inverting input coupled across both said first and second filters and to the output of said second amplifying means to provide an output signal representative of the level of guard band signal.

2. The combination of claim 1 wherein said first filter comprises a series resonant circuit tuned to said tone frequency and coupled across said summing means, and said second filter comprises a parallel resonant circuit tuned to said tone frequency and also coupled across said summing means.

3. The combination of claim 2 wherein said series resonant and parallel resonant circuits are connected in series in the order named across said summing means.

4. The combination of claim 1 wherein said summing means is coupled to said transmit and receive channel by substantially linear circuit means, and further including a compressor means coupled between said summing means and said first and second filters for applying a substantially constant level sum signal to said first and second filters.

5. The combination of claim 4 wherein said first and second filters are series resonant and parallel resonant circuits, respectively, which are tuned to said tone frequency and connected in series in the order named across the inverting input of said second amplifying means.

6. The combination of claim 1 wherein said comparator means further includes biasing means coupled to said first and second amplifying means for biasing the outputs of one and the other of said amplifying means positively and negatively, respectively, by identical amounts relative to a predetermined reference potential, first and second oppositely poled diodes respectively connected to the outputs of said one and said other amplifying means, and a capacitor connected between a point at said reference potential and a junction between said diodes; said diodes being poled so that said capacitor is charged in one sense relative to said reference potential when the level of the tone frequency signal exceeds the level of the guard band signal and in the opposite sense when the level of the guard band signal exceeds the level of the tone frequency signal.

7. The combination of claim 6 wherein said tone disabler further includes switching means for inhibiting said echo suppressor to prevent said echo suppressor from inserting attenuation into said transmit and receive channel, said combination further including integrating means coupled to said capacitor for providing an output signal representative of the average level of the charge on said capacitor, threshold detecting means coupled to said integrating means for providing an output signal when the said capacitor has charged in said one sense to an average level in excess of a predetermined threshold level, and a first timing means coupled between said threshold detecting means and said switch means for delaying the actuation of said switch means until after the average charge on said capacitor has remained above said threshold level without any substantial interruption for a predetermined period.

8. The combination of claim 7 wherein said first and second filters are series resonant and parallel resonant circuits, respectively, which are tuned to said tone frequency and connected in series in the order named across the inverting input of said second amplifying means.

9. For use with an echo suppressor of the type employed in a telephone system including separate transmit and receive channels for controllably inserting and removing attenuation into and from said channels in dependence on the signal levels existing in said channels, a tone disabler for applying an inhibiting signal to said echo suppressor in response to a tone signal of predetermined frequency which persists without substantial interruption for at least a predetermined minimum time period, said inhibiting signal preventing said echo suppressor from inserting any attenuation into said channels regardless of the signal levels existing therein; said tone disabler comprising the combination of summing means coupled to said transmit and receive channels via substantially linear circuitry to provide a sum signal representative of the signals existing in said transmit and receive channels, frequency separating means coupled to said summing means for separating said sum signal into a first signal with a level representative of the tone frequency energy in said transmit and receive channels and a second signal with a level representative of the energy of substantially all signals in said transmit and receive channels other than said tone frequency energy, a comparator means coupled to said frequency separating means for comparing the level of said first signal to the level of said second signal, a threshold detector means coupled to said comparator means for providing an output signal when the level of said first signal exceeds the level of said second signal by a predetermined threshold amount, a timing means coupled to said threshold detecting means for providing an output signal only if the level of said first signal exceeds the level of said second signal without any substantial interruption for at least a predetermined minimum time period, and solid-state s!itching means coupled to said timing means and actuated by an output signal therefrom for applying an inhibiting signal to said echo suppressor.

10. The tone disabler of claim 9 wherein said comparator means includes a first operational amplifier with an inverting input coupled to said frequency-separating means to receive only said first signal therefrom, a second operational amplifier with an inverting input coupled to said frequency separating means to receive said first and second signals therefrom, respective outputs for said first and second amplifiers, and cross coupling means between the output of said first amplifier and the inverting input of said second amplifier; said first and second amplifiers having substantially identical gains to signals received from said frequency separation means, and said second operational amplifier having substantially unity gain to signals received through said cross coupling means; whereby said first and second operational amplifiers supply output signals respectively representative of the levels of said first and second signals.

11. The tone disabler of claim 10 further including a broad band load impedance connected in shunt with said summing means, means coupling the inverting inputs of said first and second amplifiers across a predetermined portion of said load impedance, a normally conductive transistor having its collector-emitter circuit connected across said predetermined portion of said load impedance and a base coupled to said switching means, and a normally nonconductive transistor having its collector-emitter circuit connected across said frequency-separating means and a base coupled to said switching means; said switching means providing signals in response to an output signal from said timing means for switching said first and second transistors to nonconductive and conductive states respectively to thereby transfer said tone disabler to a holding mode to maintain said echo suppressor in an inhibited state until said sum signal drops below a predetermined threshold level.

12. The tone disabler of claim 11 further including a delay means coupled to said switching means for delaying the deactuation of said switching means until after the level of said sum signal has remained below said threshold level for a predetermined time period.

* * * * *